(12) United States Patent
Higashide

(10) Patent No.: US 8,693,297 B2
(45) Date of Patent: Apr. 8, 2014

(54) TRANSFER CONTROL APPARATUS AND REPRODUCING APPARATUS

(75) Inventor: Atsushi Higashide, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 13/534,670

(22) Filed: Jun. 27, 2012

(65) Prior Publication Data

US 2013/0003513 A1  Jan. 3, 2013

(30) Foreign Application Priority Data

Jul. 1, 2011 (JP) ................................. 2011-147058

(51) Int. Cl.
*G11B 20/24* (2006.01)
(52) U.S. Cl.
USPC .................................... 369/47.28; 369/53.2
(58) Field of Classification Search
None
See application file for complete search history.

(56) References Cited

U.S. PATENT DOCUMENTS

| 2004/0008600 | A1* | 1/2004 | Furukawa et al. | 369/53.37 |
| 2004/0264945 | A1 | 12/2004 | Higuchi | |
| 2010/0008200 | A1* | 1/2010 | Ogihara | 369/53.2 |
| 2010/0254235 | A1* | 10/2010 | Ikeda | 369/47.15 |

FOREIGN PATENT DOCUMENTS

| JP | 2000-67441 A | 3/2000 |
| JP | 2002-140887 A | 5/2002 |
| JP | 2003-51152 A | 2/2003 |
| JP | 2005-18849 A | 1/2005 |
| JP | 2007-141310 A | 6/2007 |

\* cited by examiner

*Primary Examiner* — Brian Miller
*Assistant Examiner* — Brian Butcher
(74) *Attorney, Agent, or Firm* — Crowell & Moring LLP

(57) ABSTRACT

Noise generation in transferring data is suppressed or prevented by transferring data at a data transfer rate according to the amount of data to be transferred to a memory. In a reproducing apparatus, when a read unit or both reads data from a storage medium or both, a determination unit determines the type of the storage medium from which the data is read, then, according to the determined type of the storage medium, a transfer rate change unit orders a data transfer unit to use a preset transfer rate corresponding to the type of the storage medium. The data transfer unit transfers the read data to the temporary storage unit at the ordered transfer rate. This allows data to be transferred without a significant change in the amount of data transfer, which suppresses or prevents noise.

7 Claims, 4 Drawing Sheets

TRANSFER CONTROL APPARATUS AND REPRODUCING APPARATUS

BACKGROUND OF THE INVENTION

1. Field of the Invention

The present invention relates to a control technique for transferring data read from a storage medium to a temporary storage unit, and typically relates to a technique applied to a reproducing apparatus that reads data from various types of storage media, such as Blu-ray Disc (BD), digital video disc (DVD), compact disc (CD) and memory card, and transfers the data to a temporary storage unit in reproduction processing.

2. Description of the Related Art

A reproducing apparatus that reads data stored in a storage medium and reproduces the data is widely used for reproducing music or video.

For example, a reproducing apparatus that reproduces video, such as a movie stored in a DVD, a reproducing apparatus that reproduces a music stored in a CD, and a reproducing apparatus that supports various types of storage media, such as DVD and CD, and reproduces a music, a movie or the like stored in the storage media are widely known.

Such a reproducing apparatus, reading a large amount of digital data, such as a music or movie, from a storage medium and performing reproduction processing, including decoding, on the digital data, needs to overcome noise generated due to high-frequency driving of a reading means for reading digital data (e.g., an optical pickup) and a noise generated due to processing of digital data as high frequency signal.

In order to overcome noise generated when data is read from a storage medium, an optical disc apparatus has been proposed that shields radiated emission of high frequency signal generated due to driving of an optical pickup housed in a DVD unit, by magnetically shielding the radiated emission of high frequency signal at a portion of the front and bottom surfaces and a portion of the both sides and rear surfaces of the DVD unit (JP-A-2002-140887).

In order to overcome noise generated due to internal processing of an apparatus, a DVD apparatus has been proposed that significantly reduces radiated emission by, in a configuration in which a circuit board is divided into a digital circuit board and a power supply board that are placed on both sides of an optical disc loader, changing how to divide the ground pattern of the digital circuit board and placing a filter on the digital circuit board adjacent to a connector (JP-A-2005-18849).

In order to overcome a problem in which, when a control signal, such as a tracking error signal output from an optical pickup, includes noise due to a high frequency component, a tracking servo control unit receiving the amplified control signal becomes unstable in position control of the optical pickup, an optical disc apparatus has been proposed that determines the type (application, country of manufacture, manufacturer and the like) of an optical medium applied to the optical disc apparatus, and, when the optical medium is a specified optical medium, activates a frequency characteristic change circuit to change the frequency characteristic to be applied to a control signal input to a servo IC so that the high frequency component of the control signal will be attenuated, thereby reducing high frequency noise included in the control signal (JP-A-2000-67441).

In order to provide an information recording/reproducing apparatus that can record/reproduce information to/from plural types of recording media without increasing the amount of hardware, an information recording/reproducing apparatus has been proposed that determines the type of a loaded optical disc (e.g., DVD or BD or the like) and changes the configuration of plural logic circuits in a reconfigurable circuit according to a program corresponding to the type of the optical disc to configure a modulation/demodulation circuit and an error correction circuit corresponding to the type of the optical disc, which allows configuration of a different type of the modulation/demodulation circuit and the error correction circuit depending on the various types of optical discs without increasing the amount of hardware (JP-A-2007-141310).

In order to provide an optical disc apparatus that controls any type of optical disc using the same CPU or optical disc controller and provides high performance and high reliability, an optical disc controller has been proposed that includes: a rewritable memory for storing information necessary for recording/reproducing of an optical disc; a determination unit for determining the type and sub-type of an optical disc; a search unit for searching a region in which the control information for the optical disc is recorded, based on the determination result given by the determination unit; a reproduction unit for reproducing the control information recorded in the region searched by the search unit; and a memory control unit for changing memory allocation based on at least one of the determination result and the control information reproduced by the reproduction unit (JP-A-2003-51152).

As described above, a reproducing apparatus, such as an optical disc apparatus, performs read processing of reading a large amount of data, such as a music or movie, from a storage medium and reproduction processing of reproducing the read data, in which, at present, the speed of the reproduction processing is slower than that of the read processing.

Specifically, whereas the processing of reading data from a storage medium can be quickly performed easily, the reproduction processing includes a complicated and time-consuming processing, such as data decoding, and also includes a processing of reproducing a music or movie in accordance with the speed of outputting to a speaker or display, which takes a certain amount of time.

Accordingly, the reproducing apparatus, including a temporary storage unit for temporarily storing data to be reproduced, reads data from the storage medium, then transfers and stores the data in the temporary storage unit, and then sequentially reads and reproduces the data stored in the temporary storage unit.

The present invention is made in the light of the event in which increase in the number of types of storage media that the reproducing apparatus can support causes noise also in transferring data to the temporary storage unit.

Specifically, the rate of transferring data to the temporary storage unit is previously constant, however, when the amount of data read from the storage medium is small (for example, the amount of data read from a CD is significantly smaller than that from a DVD), clusters of data are transferred to the temporary storage unit intermittently (e.g., at intervals of one second), as shown in the left of FIG. 3(a).

As a result, this intermittent transfer of data causes a large amount of current to instantaneously and repeatedly flow, thereby generating a high-intensity radio wave as noise.

However, no invention has been made to overcome the above-described problem, and no technique has existed to effectively manage noise due to transferring data to the temporary storage unit.

As a common practice, one method may be to cover a noise-generating portion with a shield plate. However, this method increases the number of parts, leading to a larger apparatus, a more complicated structure, and a higher product cost, so this method is not an effective solution.

In view of the above problem, it is an object of the present invention to provide a reproducing apparatus that suppresses or prevents noise generation in transferring data to a temporary storage unit.

SUMMARY OF THE INVENTION

In order to achieve the above object, the present invention is embodied in a transfer control apparatus used for a reproducing apparatus.

Specifically, the transfer control apparatus in accordance with the invention is a transfer control apparatus for transferring data read from a storage medium to a temporary storage unit, including: a determination unit for determining the type of the storage medium from which data is read; a data transfer unit for transferring data read from the storage medium to the temporary storage unit; and a transfer rate change unit for changing the data transfer rate of the data transfer unit according to the type of the storage medium determined by the determination unit to level the data transfer.

According to the transfer control apparatus in accordance with the invention, the determination unit determines the type of the storage medium, then according to the determined type of the storage medium, the transfer rate change unit changes the data transfer rate of the data transfer unit for transferring data read from the storage medium to the temporary storage unit to level the data transfer to the temporary storage unit.

For example, when the amount of data to be transferred is reduced (e.g., the storage medium is changed from a DVD to a CD), if the data transfer rate remains high as with a DVD, clusters of data are transferred to the temporary storage unit intermittently as described above. However, reducing the data transfer rate provides a leveled state in which a certain amount of the data is constantly transferred with time. Thus, leveling the data transfer to the temporary storage unit suppresses or prevents noise generation due to the intermittent transfer of data causing a large amount of current to instantaneously and repeatedly flow.

Note that, even when the amount of data transfer is not always constant with time, if the amount of data transfer varies mildly with time (without rapid change), noise generation due to the data transfer may be suppressed or prevented.

Thus, as used herein, the term "level," "leveling" and "leveled" also refers to mild change in the amount of data transfer with time, so the data transfer rate may be changed so that such extent of change may be tolerated.

Note that, for example, since the larger (smaller) the data storage capacity of the storage medium is, the larger (smaller) the amount of data may be read from the storage medium, the data transfer rate may be changed according to the type of the storage medium such that the larger (smaller) the data storage capacity of the storage medium, the higher (lower) the data transfer rate is.

Furthermore, separately from the data storage capacity, since a data reading scheme and data reading rate are defined for each type of storage medium, the leveling may be achieved by changing the data transfer rate according to data reading rate defined for each type of storage medium.

Furthermore, the invention is also embodied as a reproducing apparatus for achieving the above object.

Specifically, the reproducing apparatus in accordance with the invention is a reproducing apparatus for reading data stored in a storage medium and reproducing the data, including: a read unit for reading data from the storage medium; a determination unit for determining the type of the storage medium from which data is read by the read unit; a data transfer unit for transferring data read from the storage medium to the temporary storage unit; and a transfer rate change unit for changing the data transfer rate of the data transfer unit into a preset transfer rate corresponding to the type of the storage medium according to the type of the storage medium determined by the determination unit.

Thus, according to the reproducing apparatus in accordance with the invention, the data transfer to the temporary storage unit by the data transfer unit at a preset transfer rate corresponding to the type of the storage medium levels the data transfer to the temporary storage unit as with the transfer control apparatus described above, which suppresses or prevents noise generation due to the intermittent transfer of data causing a large amount of current to instantaneously and repeatedly flow.

Note that, in the reproducing apparatus in accordance with the invention, the preset transfer rate corresponding to the type of the storage medium may be set so that the smaller the data storage capacity of the storage medium is, the lower the data transfer rate is, and also, so that the larger the data storage capacity of the storage medium is, the higher the data transfer rate is.

Accordingly, for example, in contrast to the above, when the amount of data to be transferred is increased (e.g., the storage medium is changed from a CD to a DVD), if the data transfer rate remains low as with a CD, the data transfer to the temporary storage unit may get delayed and cause a problem for subsequent reproduction processing. However, increasing the data transfer rate allows data read from a DVD to be quickly transferred to the temporary storage unit.

Furthermore, in the reproducing apparatus in accordance with the invention, the rate of data transfer to the temporary storage unit may be preset according to a data reading scheme and data reading rate defined for each type of storage medium to suppress or prevent noise generation in transferring data.

Furthermore, in the reproducing apparatus in accordance with the invention, the plural read units may be provided according to the types of storage media.

For example, with the plural read units each corresponding to a different storage medium, the determination unit can determine the type of the storage medium from which data is read, according to which of the read units is activated.

Furthermore, in the reproducing apparatus in accordance with the invention, the determination unit can determine the type of the storage medium from which data is read by the read unit, based on an operation input from a user.

For example, in the reproducing apparatus that is configured to be able to reproduce data of a storage medium that has been already loaded into the reproducing apparatus (e.g., a hard disk apparatus or memory card) when a user performs an operation input to specify the storage medium, the determination unit can determine the type of the storage medium from which data is read, based on the operation input.

Furthermore, in the reproducing apparatus in accordance with the invention, the read unit may be an optical pickup for optically reading data from an optical disc as a storage medium, and the determination unit may determine the type of the optical disc based on changing of the optical pickup.

For example, in the reproducing apparatus having a disc loader (read unit) including an optical pickup for BD and an optical pickup for DVD that is used for reading from a BD and also from a DVD, the determination unit may determine whether an optical disc is a BD or DVD, based on changing of the optical pickup by the disc loader.

The invention is configured as a reproducing apparatus that can reproduce at least two types of storage media from various storage media including a Blu-ray Disc (BD), digital video disc (DVD), compact disc (CD), memory card and hard disk apparatus (HDD).

Furthermore, the reproducing apparatus in accordance with the invention may also be configured as a recording/reproducing apparatus also capable of recording data, such as a music or video, to a storage medium.

Furthermore, each functional unit of the transfer control apparatus and the reproducing apparatus in accordance with the invention may be configured by executing a program using computer hardware including a processor and a memory, or may be configured as a hardware apparatus using an electric circuit.

According to the invention, noise generation in transferring data may be suppressed or prevented by transferring data to the temporary storage unit at a data transfer rate according to the amount of data to be transferred.

This can eliminate the need for providing a shield plate, which can provide a reproducing apparatus that prevents failure due to noise generation without leading to a larger apparatus, a more complicated structure, and a higher product cost.

DETAILED DESCRIPTION OF THE INVENTION

Figure 1:
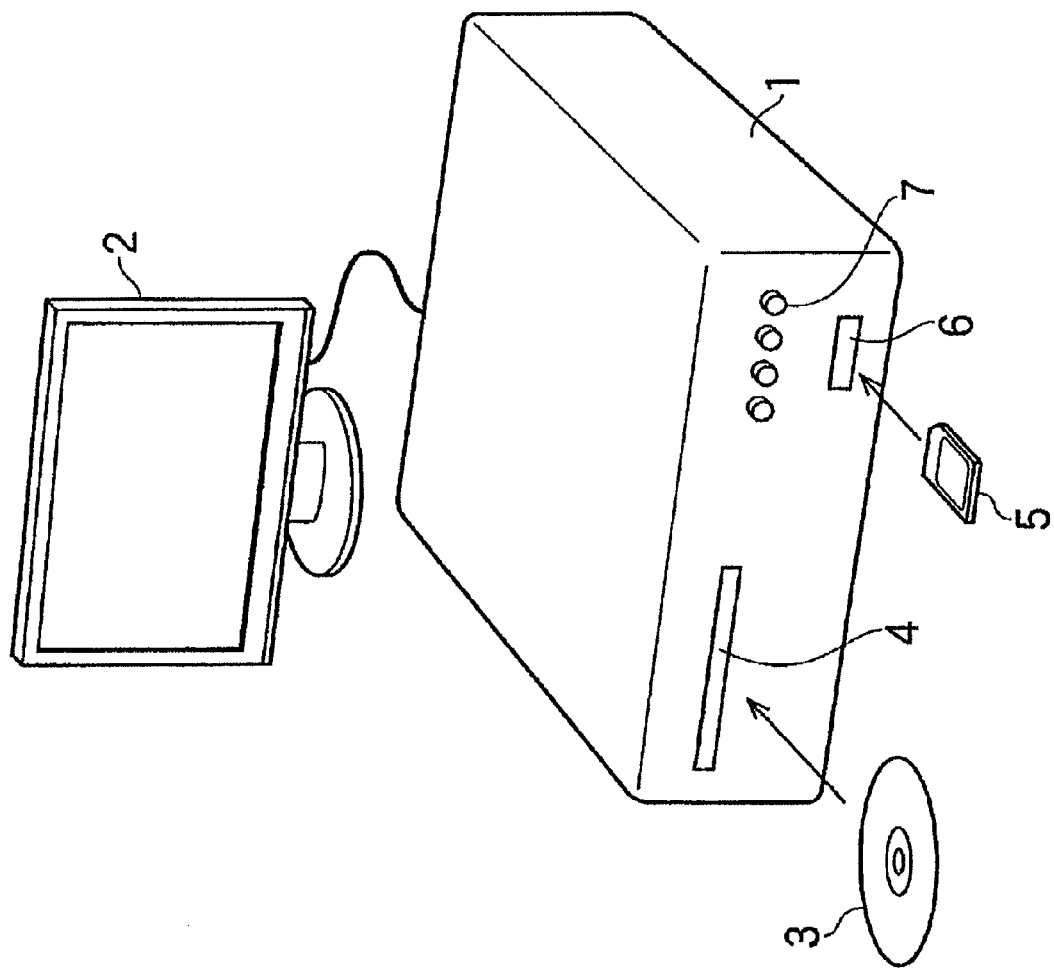
FIG. 1 shows an appearance of a reproducing apparatus in accordance with an embodiment of the invention.

The present invention is specifically described based on an embodiment shown in the drawings.

As shown in FIG. 1, a reproducing apparatus 1 in accordance with the embodiment is connected to a television set 2 and outputs a reproduced video or music through a display or speaker of the television set 2.

The reproducing apparatus 1 includes: a disc loader (read unit) 4 for loading an optical disc 3, such as BD, DVD and CD; a card reader (read unit) 6 for loading an SD memory card 5; and buttons (operation part) 7 for receiving an operation input from a user. Note that an HDD apparatus may also be connected to the reproducing apparatus 1.

That is, the reproducing apparatus 1 includes the read unit 4 commonly used for three types of storage media 3, such as BD, DVD and CD, and the read unit 6 used for a storage medium (SD memory card). When the HDD apparatus is connected, the reproducing apparatus 1 includes an interface as a read unit for receiving data output from the HDD apparatus.

Figure 2:
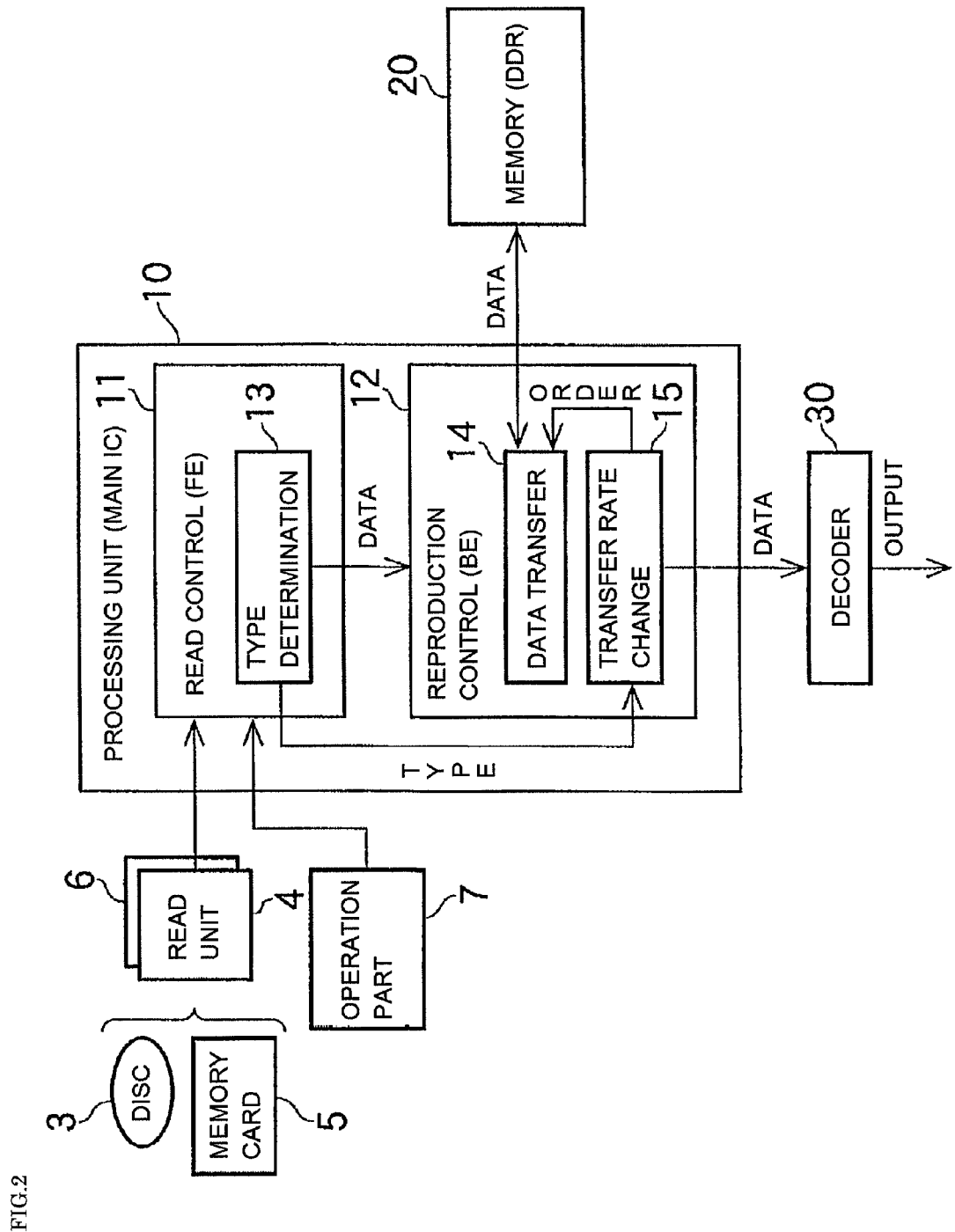
FIG. 2 illustrates a configuration of the main part of the reproducing apparatus in accordance with the embodiment of the invention.

FIG. 2 shows a functional configuration included in the reproducing apparatus 1 for reading data from a storage medium and reproducing the data.

The reproducing apparatus 1 includes: a processing unit 10 for controlling read processing and reproduction processing of data; a double data rate random access memory (DDRRAM) 20 used as a temporary storage memory for the processor; and a decoder 30 for decoding data.

The processing unit 10 consists of a semiconductor device referred to as MAIN IC including: a read control unit 11 relating to data read control as a front end part (FE); and a reproduction control unit 12 relating to data reproduction control as a back end part (BE).

In response to loading the storage medium 3 or 5 or both into the read unit 4 or 6 or both, the read control unit 11 controls the appropriate read unit to read digital data, such as a music or movie, recorded in the storage medium. In this control, a type determination unit 13 included in the read control unit 11 determines the type of the storage medium from which the digital data is read.

The disc loader 4 selects an optical pickup according to the type of the loaded optical disc 3. For example, the disc loader 4 selects a blue laser optical pickup for BD, a red laser optical pickup for DVD, and a near infrared laser optical pickup for CD. The type determination unit 13 receives from the disc loader 4 a signal indicative of the type of the selected optical pickup to determine the type of the optical disc from which data is read.

Note that the way in which the type determination unit 13 determines the type of the optical disc from which data is read is not limited. For example, the type determination unit 13 may determine the type of the optical disc from which data is read, based on a user input to the operation part (buttons) 7 specifying the type of the optical disc loaded into the disc loader 4.

Or the type determination unit 13 may determine the type of the recording medium from which data is read, based on the fact that the SD memory card 5 is loaded into the read unit 6 dedicated to an SD memory card. In this embodiment, the type determination unit 13 determines that the recording medium from which data is read is an SD memory card, based on a user input to the operation part (buttons) 7.

This allows a user to keep the SD memory card 5 storing a music or the like loaded in the reproducing apparatus 1 and input an operation to reproduce the data in the SD memory card 5 at any time.

The reproduction control unit 12, including a data transfer unit 14 and a transfer rate change unit 15, performs control for outputting data read from the storage medium 3 or 5 or both to the decoder 30, utilizing the memory 20 as a temporary storage.

The data transfer unit 14 performs processing of outputting and storing data read from the storage medium 3 or 5 or both in the memory 20 and processing of reading data stored in the memory 20. The data transfer unit 14 can select the data transfer rate for the outputting and reading from several rate options as ordered by the transfer rate change unit 15.

Based on a type indicating signal input from the type determination unit 13, the transfer rate change unit 15 outputs a signal to the data transfer unit 14 indicating a data transfer rate preset according to the type of the storage medium 3 or 5 from which data is read by the read unit 4 or 6 or both.

In the transfer rate change unit 15 of the embodiment, several data transfer rates are preset corresponding to the types of the storage media so that the amount of data transfer will be leveled with respect to the elapse of time in data transfer to/from the memory 20. The transfer rate change unit 15 orders the data transfer unit 14 to change the data transfer rate according to the determined type of the storage medium.

More specifically, in the transfer rate change unit 15 of the embodiment, the data transfer rate is preset so that: the smaller (larger) the data storage capacity of a storage medium, the lower (higher) the data transfer rate; and the lower (higher) the rate of reading data from the storage medium, the lower (higher) the data transfer rate, and based on this, several data transfer rates preset so that data transfer to/from the memory 20 will be leveled are prepared.

In the configuration of the reproducing apparatus 1, the processing unit 10 including the determination unit 13, the data transfer unit 14 and the transfer rate change unit 15 forms a transfer control apparatus for transferring data read from a storage medium to the memory 20.

Next, the processing operation of the reproducing apparatus 1 having the above configuration is described.

First, when the storage medium 3 or 5 or both is loaded into the read unit 4 or 6 or both and the reproducing apparatus 1 starts reproduction, the read unit into which the storage medium is loaded reads digital data stored in the storage medium, and the type determination unit 13 determines the type of the storage medium, under the control of the read control unit 11.

Then, the transfer rate change unit 15, informed of the determined type of the storage medium, orders the data transfer unit 14 to use the transfer rate corresponding to the determined type. On the other hand, the data transfer unit 14 receives the read digital data, and transfers and stores the digital data in the memory 20 at the transfer rate ordered by the transfer rate change unit 15.

Then, depending on decoding or the like by the decoder 30, the digital data stored in the memory 20 is read and outputted to the decoder 30. Then, a music or video decoded by the decoder 30 is presented by the television set 2.

Figure 4:
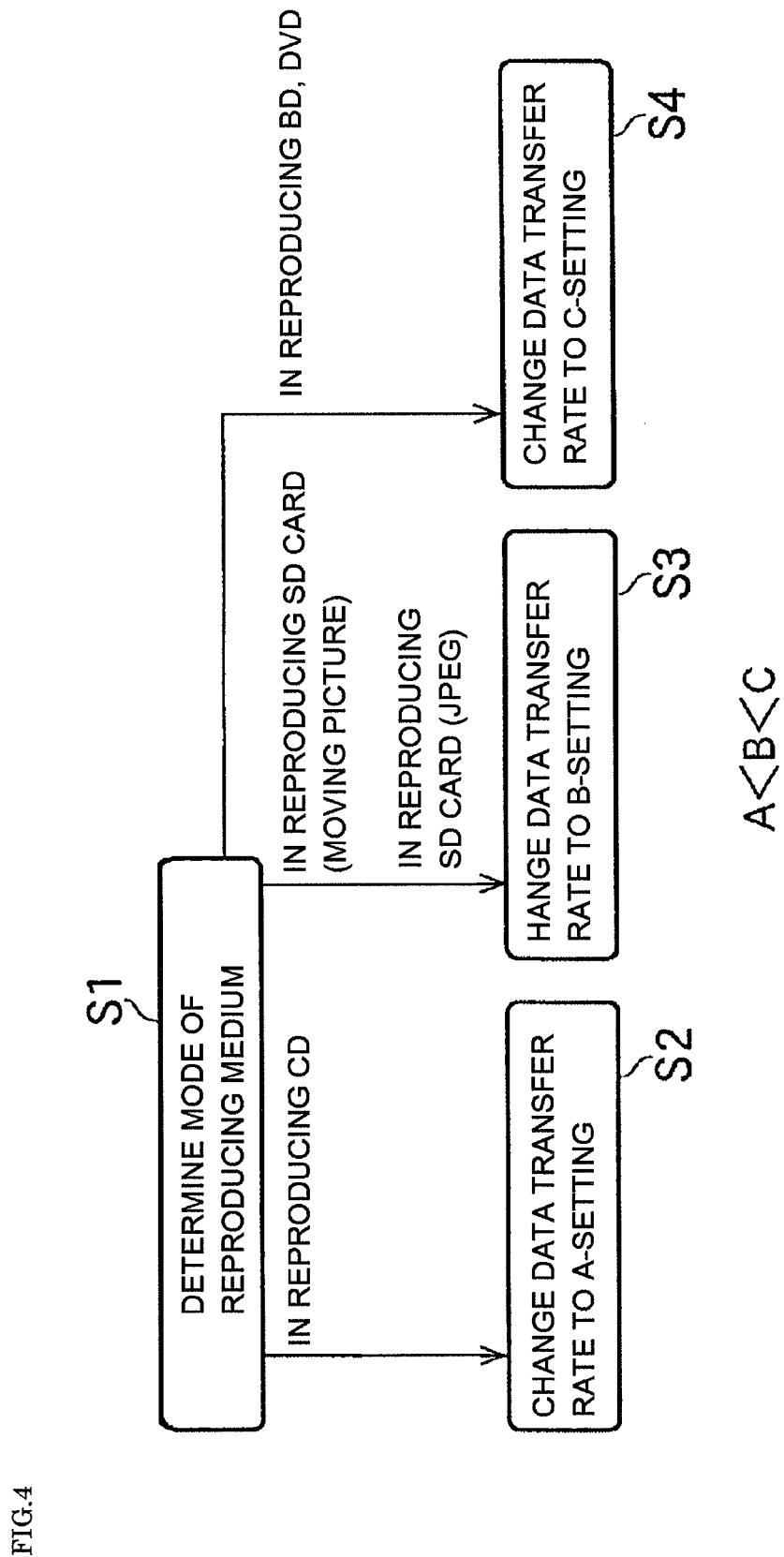
FIG. 4 illustrates changing of a data transfer rate in accordance with the embodiment of the invention.

The transfer rate is ordered by the transfer rate change unit 15 as shown in FIG. 4.

First, the transfer rate change unit 15 determines the reproduction mode (i.e., type) of the storage medium from the determination result (step 1). For the mode of reading digital data from a CD to reproduce, the transfer rate change unit 15 orders the data transfer unit 14 to use an A-setting data transfer rate (step S2). For the mode of reading digital data from an SD memory card to reproduce, the transfer rate change unit 15 orders the data transfer unit 14 to use a B-setting data transfer rate (step S3). For the mode of reading digital data from a BD or DVD to reproduce, the transfer rate change unit 15 orders the data transfer unit 14 to use a C-setting data transfer rate (step S4).

In this setting, the relation between these data transfer rates is: the A-setting<the B-setting<the C-setting. For example, the data transfer rate for the mode of reading digital data from a CD to reproduce (A-setting) is lower than that for the mode of reading digital data from a BD or DVD to reproduce (C-setting).

Figure 3:
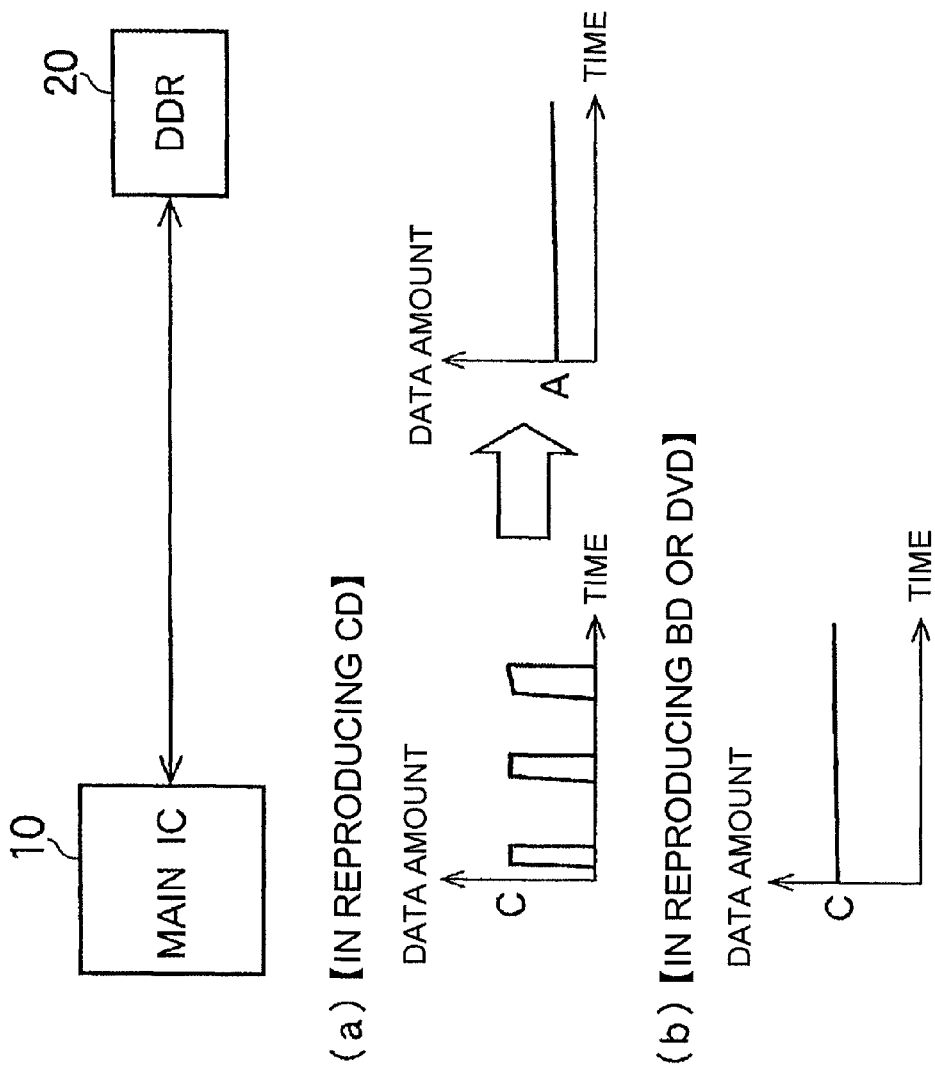
FIG. 3 illustrates a data transfer state in accordance with the embodiment of the invention.

As a result, for example, in reproducing a CD, if the data transfer rate is high as in reproducing a BD or DVD (C-setting), digital data would be intermittently transferred to the memory 20 to generate noise, as shown in the left of FIG. 3(*a*), however, in this embodiment, the data transfer rate is changed to an appropriate rate for transferring data read from a CD, so the digital data is transferred to the memory 20 without a significant change in the amount of data transfer as shown in the right of FIG. 3(*a*), which eliminates noise generation.

Also, in reproducing a BD or DVD, the data transfer rate of the data transfer unit 14 is changed to the C-setting rate appropriate for transferring digital data read from a BD or DVD as in the above, so the digital data is transferred to the memory 20 at a relatively high rate without a significant change in the amount of data transfer as shown in FIG. 3(*b*), which eliminates noise generation.

What is claimed is:

1. A transfer control apparatus for transferring data read from a storage medium to a temporary storage unit, comprising:
   a determination unit for determining the type of the storage medium from which data is read;
   a data transfer unit for transferring data read from the storage medium to the temporary storage unit; and
   a transfer rate change unit for changing the data transfer rate of the data transfer unit according to data storage capacity of the storage medium based on the type of the storage medium determined by the determination unit so as to level an amount of the data transferred by the data transfer unit.

2. A reproducing apparatus for reading data stored in a storage medium and reproducing the data, comprising:
   a read unit for reading data from the storage medium;
   a determination unit for determining the type of the storage medium from which data is read by the read unit;
   a data transfer unit for transferring data read from the storage medium to a temporary storage unit; and
   a transfer rate change unit for changing the data transfer rate of the data transfer unit into a preset transfer rate corresponding to data storage capacity of the storage medium based on the type of the storage medium determined by the determination unit so as to level an amount of the data transferred by the data transfer unit.

3. The reproducing apparatus according to claim 2, wherein the preset transfer rate corresponding to the type of the storage medium is set so that the smaller the data storage capacity of the storage medium is, the lower the data transfer rate is.

4. The reproducing apparatus according to claim 2, wherein the preset transfer rate corresponding to the type of the storage medium is set so that the larger the data storage capacity of the storage medium is, the higher the data transfer rate is.

5. The reproducing apparatus according to claim 2, wherein a plurality of the read units are provided according to the types of storage media.

6. The reproducing apparatus according to claim 2, wherein the determination unit determines the type of the storage medium from which data is read by the read unit, based on an operation input from a user.

7. The reproducing apparatus according to claim 2, wherein the read unit is an optical pickup for optically reading data from an optical disc as a storage medium, and
   wherein the determination unit determines the type of the optical disc based on changing of the optical pickup.

\* \* \* \* \*